United States Patent [19]

Martin

[11] Patent Number: 4,875,168

[45] Date of Patent: Oct. 17, 1989

[54] ENGINE SPEED CONTROL APPARATUS

[75] Inventor: Anthony N. Martin, Simsbury, Conn.

[73] Assignee: United Technologies Corporation, Hartford, Conn.

[21] Appl. No.: 136,797

[22] Filed: Dec. 22, 1987

[51] Int. Cl.⁴ .............................................. F02C 9/42
[52] U.S. Cl. .............................. 364/431.01; 60/39.24; 60/39.281
[58] Field of Search ..................... 364/431.01, 431.02, 364/439, 565, 442, 440; 60/39.24, 39.281, 243

[56]  References Cited
U.S. PATENT DOCUMENTS

| | | | |
|---|---|---|---|
| 4,258,545 | 3/1981 | Slater | 364/431.02 X |
| 4,296,601 | 10/1981 | Martin | 364/431.02 X |
| 4,303,976 | 12/1981 | Joby | 364/431.02 |
| 4,410,948 | 10/1983 | Doniger | 364/431.01 |

*Primary Examiner*—Parshotam S. Lall
*Assistant Examiner*—Thomas G. Black
*Attorney, Agent, or Firm*—Dominic J. Chiantera

[57]  ABSTRACT

Apparatus for synchronizing the spool speed between engines of a multi-engine aircraft having, for each engine, an electronic engine control (EEC) with a speed rating logic portion having an engine speed algorithm for calculating an EEC command speed signal (N sel) and a speed governing loop portion providing for commanding engine fuel flow in dependence on a command speed signal, includes a synchronizer reference unit (SRU) having the same engine speed algorithm used in the EEC, for calculating a independent SRU command speed signal for presentation to all EEC speed governing loops, alternatively with the individual engine EEC command speed signals, in response to operator control.

2 Claims, 2 Drawing Sheets

ENGINE SPEED CONTROL APPARATUS

DESCRIPTION

Technical Field

This invention relates to aircraft engines, and more particularly to apparatus for synchronizing engine rotational speed on a multi-engine aircraft.

Background Art

Engine speed control devices are well known in the art for maintaining identical speeds between engines on a multi-engine aircraft. These speed controls maintain near equal rotational speeds among specific engine spools, to minimize vibration and acoustic cabin noise caused by asynchronous rotation, which causes cyclical disturbances that are transmitted to the aircraft fuselage.

The prior art controls use a master/slave protocol. The synchronizer control maintains the instantaneous speed of the selected spool (or "rotor") each slave engine to that of a designated master engine. The speed of each slave engine spool is, compared with the sensed master engine speed to detect a difference value. The engine's fuel flow is adjusted to change each spool speed, as necessary, to reduce the difference.

The master/slave protocol, while acceptable to small business aircraft manufacturers (commuters or business), is not permitted by some of the large commercial aircraft manufacturers since it is a "cross coupling of engine functions". There is a possibility that a master engine failure in a reduced engine power direction which, may pull down performance of the slave engines. Although the engine speed controls have a limited range of authority within which pull down may occur (typically ±4.0% of set speed), this is a significant reduction for the approach and landing flight modes. It is desirable, therefore, to perform the speed synchronization function without cross coupling the engine functions.

DISCLOSURE OF INVENTION

The object of the present invention is to eliminate cross coupling in an engine speed control by comparing the sensed speed of each engine to an independent speed reference value.

According to the present invention, apparatus for synchronizing engine speed on a multi-engine aircraft having, for each engine, an electronic engine control (EEC) with a speed rating logic portion responsive to sensed engine data and to an engine speed algorithm for calculating an EEC command speed signal (N sel), and with a speed governing loop portion providing an EEC command fuel flow signal (Wf) in dependence on the EEC command speed signal, and having a fuel control unit (FCU) for metering fuel to the engine in dependence on the magnitude of the command fuel flow signal, includes: a synchronizer reference unit (SRU) having a signal processor responsive to the EEC sensed flight data parameters and having a signal memory with stored signals defining the engine speed algorithm used in the EEC, for calculating a common SRU command speed signal, and further includes for each EEC an electronic switch interconnected between the EEC speed rating logic portion and the EEC speed governing loop portion, and responsive to both the EEC and SRU command speed signals for selecting either one for presentation to the EEC governing portion, in response to operator control.

In further accord with the present invention, the SRU speed signal is provided in a pulsed signal format in which the pulse repetition frequency (PRF) is indicative of desired spool RPM.

The present invention synchronizes engine spool speed without the cross coupling of engine functions, thereby eliminating the possibility of a cross coupling failure mode of the synchronizing control apparatus. An independent SRU command speed is provided through use of known electronic engine control (EEC) algorithms.

To ensure safety, the synchronizer control apparatus is deactivated in the presence of detected system faults, or if the sensed flight data indicates that improper synchronizer control conditions exist, i.e. one engine is set at a much different power setting from the others. The system may be architecturally configured at the same level of redundancy and self-test as the aircraft's EEC systems, thereby providing the highest degree of reliability performance.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
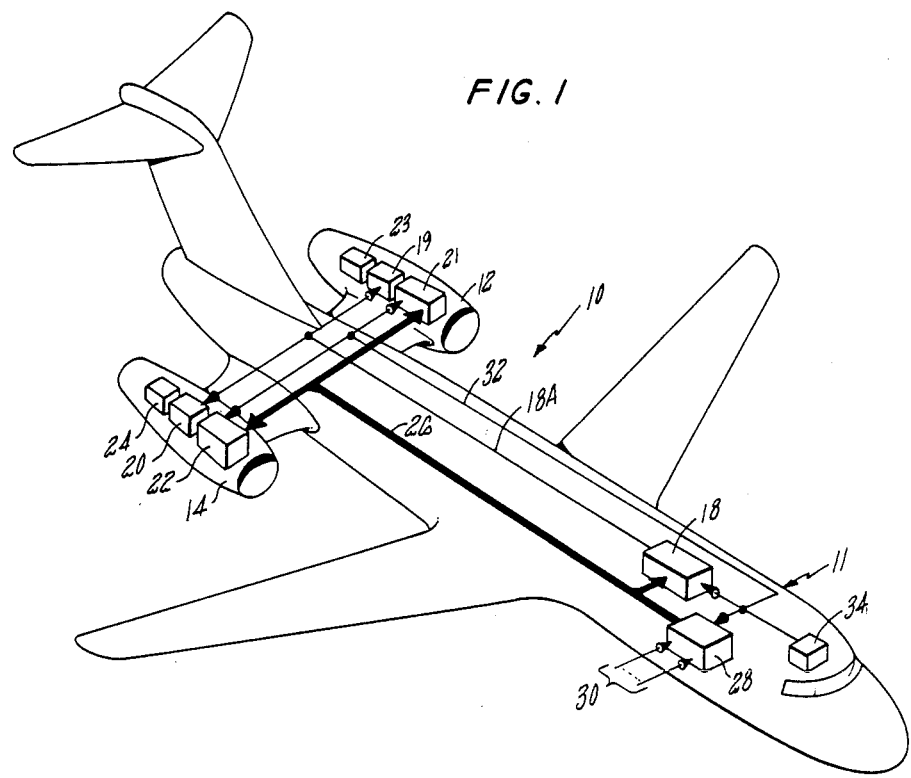
FIG. 1 is a figurative illustration showing installation of the present apparatus in a propeller driven aircraft.

FIG. 1 figuratively illustrates installation of the present speed synchronizer apparatus 10 in an aircraft 11 having rear mounted port and starboard engines 12, 14. The apparatus includes a synchronizer reference unit (SRU) 18 connected through lines 18A to electronic switches 19, 20 associated with the port and starboard engines. The switches are electrically interconnected between the speed rating logic (SRL) portion 21, 22 and speed governing loop (SGL) portion 23, 24 of the associated engine's electronic engine control (EEC).

The EEC is a prior art control device which is resident on the aircraft. Although it is adapted to function with the present speed synchronizer system, it is not part of the present invention. Similarly, to simplify the description, those engine control elements which do not function with the present invention are not shown, even though necessary for operation.

The SRU 18 and the EEC SRL portions 21, 22 receive selected flight data provided on the aircraft data bus 26 by the aircraft's data acquisition unit (DAU) 28 from data sensors 30 (not shown) installed throughout the aircraft. The SRU and EECs also receive throttle lever angle (TLA) sensed position information on line 32 from the flight deck control console 34. As described in detail hereinafter with respect to FIG. 3, the EEC SGL portions 23, 24 provide a command fuel flow signal to each engine's fuel control unit (FCU, not shown in FIG. 1).

As known, the shaft RPM is determined by tachometer measurement, i.e. proximity sensing of the rotation of the shaft's gearteeth, to produce a pulsed signal. The sensed speed is a pulse train, with N number of pulses per revolution. The N value may range from 15 to 60.

Figure 2:
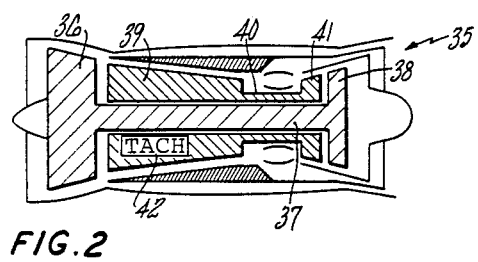
FIG. 2 illustrates the concept of propeller phasing, as used in the description of the invention.

FIG. 2 is a simplified illustration of a twin spool turbofan engine 35 with which the present invention may be used. The engine includes a low compressor 36 driven through a low speed shaft 37 by a low turbine 38, and a high compressor 39 driven through the high speed shaft 40 by a high turbine 41. While both shaft speeds (N1, N2) are monitored, it is typically the low speed spool (shaft 37) which is speed synchronized due to the greater degree of vibration. Tachometer 42 is used to provide the sensed speed signal. The pulse repetition frequency (PRF) of the sensor output is directly proportional to blade RPM:

$$\frac{pulse}{second} \times \frac{revolutions}{pulse} \times \frac{seconds}{minute} = RPM$$

Figure 2A:
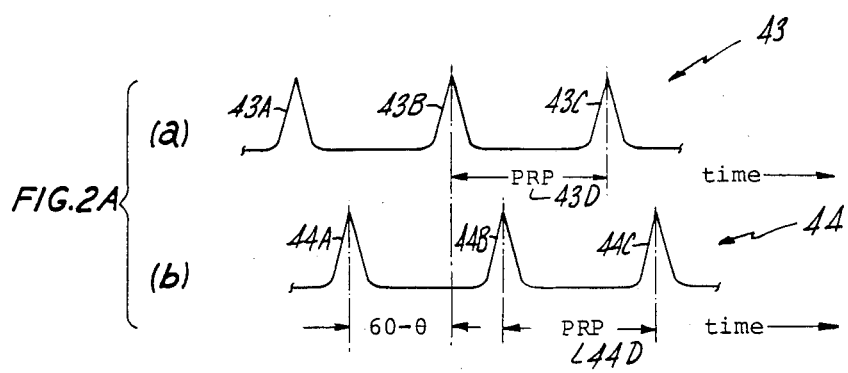
FIG. 2A is a waveform illustration used in the description of FIG. 2.

FIG. 2A, illustrations (a) and (b) show the tachometer sensor waveforms 43 and the command speed waveform 44 (either EEC or SRU), respectively. The tachometer waveform pulses 43A–43C and the command speed pulses 44A–44C, have pulse repetition periods 43D, 44D which are directly proportional to the actual speed (RPM) of the low spool and the command value (RPM).

Figure 3:
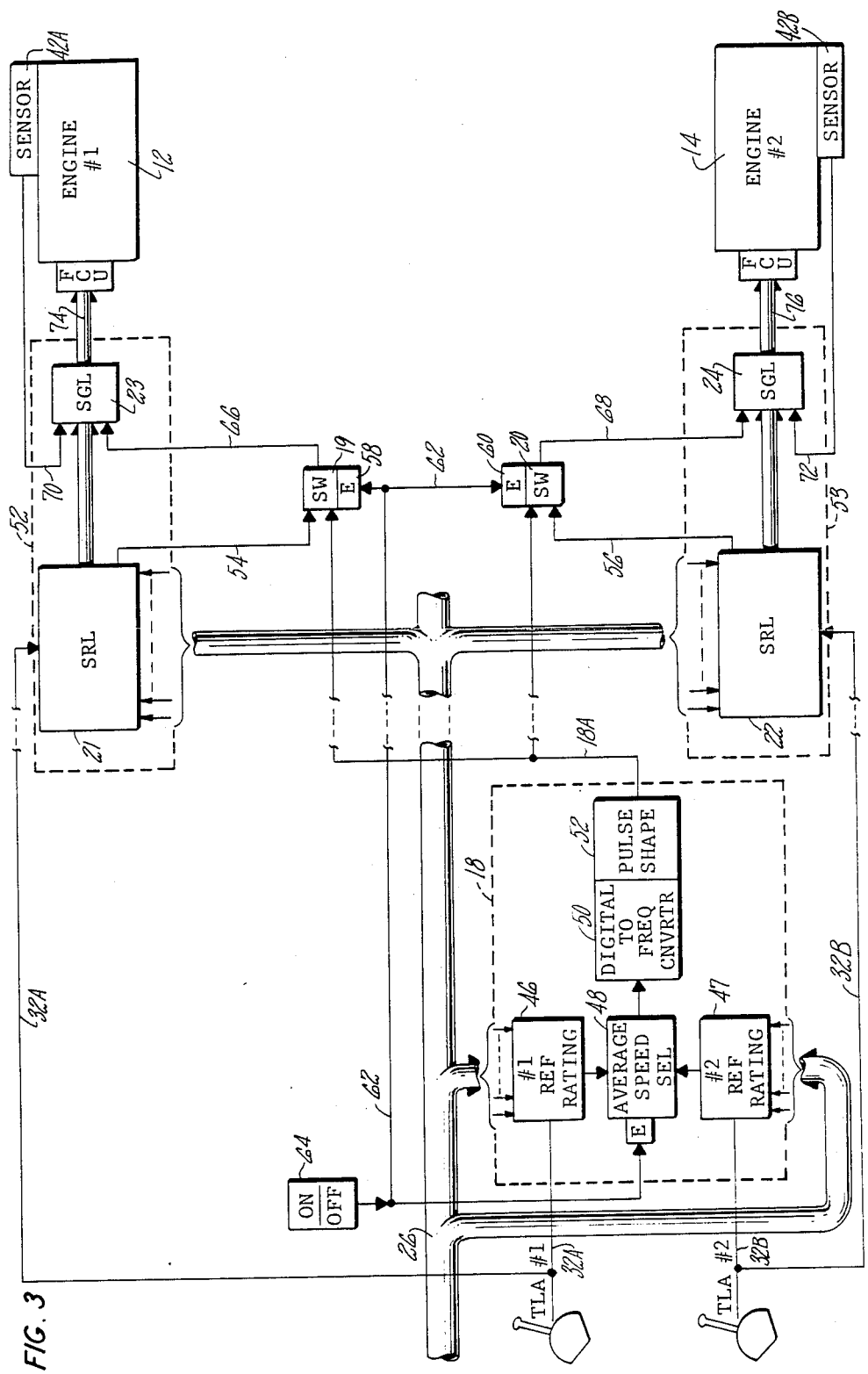
FIG. 3 is a schematic block diagram of the phase control apparatus illustrated in FIG. 1.

FIG. 3 is a schematic block diagram of the present system with the related engine control elements. The elements of FIG. 3 which are common to FIG. 1 are given the same reference numerals. For ease of description, the port and starboard engines (12, 14) are labeled engine #1 and engine #2. To emphasize the association of elements to a particular engine, the #1 and #2 indicators are also used in connection with those elements.

The SRU 18 includes first (#1) and second (#2) reference rating units 46, 47 which calculate desired speed for each engine. These are the desired spool speed under the prevailing operating conditions and TLA setting for each engine. The values are calculated using the same input data and program schedule algorithms used by each EEC to provide the EEC command speed signal for the engine.

The flight data required for each reference speed unit may vary with engine type. In general it includes the TLA settings, the engine rating demands, the engine operating conditions, flight mode data (take-off, climb, cruise, etc.), and the sensed values of: aircraft speed ($M^\#$), outside air pressure ($P_0$), and air temperature ($T_0$). The reference speed units receive the TLA settings (TLA #1, TLA #2) on lines 32A, 32B.

The individual reference speed signals typically differ in value due to signal tolerances and actual differences in the TLA positions. To provide a single SRU command speed signal, the individual reference speed values are typically combined as an average. It should be understood, however, that any other manner of combination, such as a maximum value select or a minimum value select may be used, as deemed necessary for a particular application by those skilled in the art.

In FIG. 3 the calculated speed signals are presented to an SRU averaging circuit 48 which provides the average of the two. The averaged value represents a shaft speed which, if applied to both engines, would give approximately the same total aircraft thrust as the individually calculated reference speed values.

The average speed signal is presented to digital-to-frequency converter circuitry 50 which converts the average speed to a pulsed signal having a PRF corresponding to that of an N tooth gear rotating at the command speed (RPM). The pulse signal is shaped in conditioning circuitry 52 and presented on line 18A as the SRU command speed signal to the switches 19, 20.

Each of the switches 19, 20 receive the SRU command speed signal at a first input, and receive at a second input the EEC command speed signals from from the SRLs 21, 22 of the port and starboard engine EECs 52, 53, on lines 54, 56. To the extent permitted by tolerance differences, the EEC command speed value is equal to the individual speed signal values calculated in the SRU reference rating units 46, 47 since, as described hereinbefore, the EEC and the reference units each use the same sensed flight data inputs and the same speed and phase algorithm. The EEC command speed signal format is in the same pulsed signal format as the SRU command speed value and the two command signals are equal in value to the extent permitted by tolerances and the effect of the combining (averaging in the best mode embodiment) of the individual signal values.

The switches 19, 20 are a gated (enable), double throw electronic switch, of a type well known in the art. Each switch has an enable (E) gate input 58, 60 for receiving an SRU ENABLE gate signal on lines 62 from an operator select switch 64 located on the aircraft's flight deck. When enabled, each switch selects the SRU command speed signal for presentation on output lines 66, 68 to the related SGL portions 23, 24 of the two EECs. When disabled, each selects the EEC command speed signal on lines 54, 56 for presentation to the SLGs. The SRU is normally on, i.e. the switches enabled, but may be disabled automatically (not shown) if the aircraft system self test functions in the aircraft systems indicate a fault.

Each SGL also receives the sensed actual spool RPM value on lines 70, 72 from the engine mounted tachometer 42A, 42B. Each SLG compares the sensed RPM signal with the command speed signal to detect a speed difference magnitude, i.e. speed error signal. The SLGs each provide individual command fuel flow signals (Wf), at a magnitude dependent on the magnitude of the speed error signal, on lines 74, 76 to the fuel control unit (FCU) of the engine. Each FCU changes engine speed in a direction to reduce the error signal, thereby providing speed synchronization between the engine spools.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus, for synchronizing the speed of engines on an aircraft, the engines being of the type having an electronic engine control (EEC) unit and a fuel control unit (FCU), the EEC unit having speed rating logic (SRL) circuitry and speed governing loop (SGL) circuitry, the SRL circuitry including a signal processor with signal memory for storing signals representing an engine speed algorithm, the processor using the algorithm to calculate the magnitude of an EEC command speed signal (N sel) in response to sensed operating data received from the aircraft, the SGL circuitry receiving the EEC command speed signal at an input thereof for providing a command fuel flow signal (Wf) to the FCU at a magnitude dependent on the magnitude of the EEC command speed signal, the FCU controlling fuel to the engine in dependence on the magnitude of the command fuel flow signal, the apparatus comprising:

synchronizer reference unit (SRU) means, responsive to the sensed operating data from the aircraft, and having SRL circuitry for calculating a SRU command speed signal at a magnitude substantially equal to that of the EEC command speed signal; and electronic switch means, one associated with each EEC unit, each switch means receiving the EEC command speed signal from the SRL circuitry of the associated EEC unit at a first input thereof, and each switch connected at an output thereof to the input of the SGL circuitry of the associated EEC unit, each switch further receiving the SRU command speed signal from the SRU means at a second input thereof, each said switch means being responsive to operator control for selectably connecting one of said inputs to said output, whereby the SGL circuitry provides the command fuel flow at a magnitude dependent, alternately, on the magnitude of the EEC command speed signal and on the magnitude of the SRU command speed signal.

2. The apparatus of claim 1, wherein said switch means are each selectably connecting the same said input to the same said output at the same time.

* * * * *